(12) United States Patent
Tekulve et al.

(10) Patent No.: US 9,179,814 B2
(45) Date of Patent: Nov. 10, 2015

(54) CLEANING ARTICLE COMPRISING LINES OF FRANGIBILITY WITH MARKED INDICIA

(75) Inventors: Michelle Margaret Tekulve, Cincinnati, OH (US); Aaron W. Fromm, Fort Thomas, KY (US); Terra Louise Dent, Mason, OH (US); Christopher Lee Henderson, Liberty Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 10 days.

(21) Appl. No.: 13/604,769

(22) Filed: Sep. 6, 2012

(65) Prior Publication Data

US 2013/0269137 A1 Oct. 17, 2013

Related U.S. Application Data

(63) Continuation-in-part of application No. 29/418,221, filed on Apr. 13, 2012, now Pat. No. Des. 679,063.

(51) Int. Cl.
*A47L 25/00* (2006.01)
*A47L 13/16* (2006.01)
*C08J 9/36* (2006.01)

(52) U.S. Cl.
CPC .. *A47L 13/16* (2013.01); *C08J 9/36* (2013.01); *C08J 2361/28* (2013.01)

(58) Field of Classification Search
None
See application file for complete search history.

(56) References Cited

U.S. PATENT DOCUMENTS

| | | |
|---|---|---|
| 1,778,270 A | 10/1930 | Miller |
| 4,764,421 A | 8/1988 | Horiki et al. |
| 4,797,310 A | 1/1989 | Barby et al. |
| 4,822,650 A | 4/1989 | Horiki et al. |
| 4,835,026 A | 5/1989 | Horiki et al. |
| 4,913,786 A * | 4/1990 | Horiki et al. .................. 205/122 |
| 5,164,238 A | 11/1992 | Horiki et al. |
| 5,360,653 A | 11/1994 | Ackley |
| 5,500,267 A | 3/1996 | Canning |
| 5,540,880 A | 7/1996 | Horiki et al. |
| 5,605,731 A * | 2/1997 | Guasch Pubill ................ 428/43 |
| 5,616,387 A | 4/1997 | Augst et al. |
| 5,685,042 A | 11/1997 | Demetriades |
| 5,712,210 A | 1/1998 | Windisch et al. |

(Continued)

FOREIGN PATENT DOCUMENTS

| | | |
|---|---|---|
| EP | 0 307 932 A1 | 3/1989 |
| EP | 0 370 796 A1 | 5/1990 |

(Continued)

OTHER PUBLICATIONS

CandyWarehouse.com, Inc., "Hershey's Milk Chocolate Bars: 36-Piece Box". May 18, 2012, <http://www.candywarehouse.com/products/hersheys-milk-chocolate-bars-36-piece-box/>.*

(Continued)

*Primary Examiner* — David Sample
*Assistant Examiner* — Donald M Flores, Jr.
(74) *Attorney, Agent, or Firm* — Larry L. Huston; Steven W. Miller

(57) ABSTRACT

A melamine-based foam block for cleaning has lines of frangibility that separate the melamine-based block into pads that are delineated. A melamine-based foam block for cleaning has lines of frangibility that separate the melamine-based foam block into pads that are different sizes and that are delineated.

8 Claims, 3 Drawing Sheets

(56) References Cited

U.S. PATENT DOCUMENTS

| | | |
|---|---|---|
| 5,902,642 A | 5/1999 | Horiki et al. |
| 6,010,090 A * | 1/2000 | Bushmaker et al. ........ 242/526.1 |
| 6,234,858 B1 * | 5/2001 | Nix ................................ 446/97 |
| 6,298,517 B1 | 10/2001 | McKay |
| 6,313,049 B1 | 11/2001 | Heady et al. |
| 6,462,160 B1 | 10/2002 | Ogawa et al. |
| 6,548,135 B1 * | 4/2003 | Hershey et al. .............. 428/40.1 |
| 6,548,136 B1 | 4/2003 | Piccini et al. |
| 6,550,633 B2 | 4/2003 | Huang et al. |
| 6,608,118 B2 * | 8/2003 | Kosaka et al. ................ 521/187 |
| 6,827,080 B2 | 12/2004 | Fish et al. |
| D591,018 S | 4/2009 | Bogaerts et al. |
| 7,629,043 B2 | 12/2009 | Lindsay et al. |
| D634,495 S | 3/2011 | Dunshee et al. |
| D657,925 S | 4/2012 | Luipold |
| 2005/0025668 A1 | 2/2005 | Katsigras et al. |
| 2005/0129897 A1 | 6/2005 | Zhou et al. |
| 2005/0136238 A1 | 6/2005 | Lindsay et al. |
| 2005/0202232 A1 | 9/2005 | Sauniere |
| 2006/0000043 A1 | 1/2006 | Jou-Chen et al. |
| 2007/0166488 A1 * | 7/2007 | Trefethren et al. .......... 428/34.1 |
| 2007/0224409 A1 | 9/2007 | Devorany et al. |
| 2011/0311749 A1 * | 12/2011 | McNeil et al. .................. 428/43 |

FOREIGN PATENT DOCUMENTS

| | | |
|---|---|---|
| EP | 0370796 A1 * | 5/1990 |
| EP | 0 676 246 A1 | 10/1995 |
| GB | 1035475 A | 7/1966 |
| JP | 2020329 A1 | 1/1990 |
| JP | 2003116762 A * | 4/2003 |

OTHER PUBLICATIONS

"Materials to Control Sound and Eliminate Noise—Cloudscape® Ceiling Tiles"; AcousticsFirst® Corporation (Snapshot dated—Apr. 13, 2011) <http://www.acousticsfirst.com/accoustical-foam-cloudscape-ceiling-tiles.htm>.*

U.S. Appl. No. 29/418,221, filed Apr. 13, 2012, Tekulve, et al.

U.S. Appl. No. 29/444,481, filed Jan. 31, 2013, Tekulve, et al.

* cited by examiner

CLEANING ARTICLE COMPRISING LINES OF FRANGIBILITY WITH MARKED INDICIA

CROSS-REFERENCE TO RELATED APPLICATION(S)

This application claims priority to U.S. Design application Ser. No. 29/418,221, filed Apr. 13, 2012.

FIELD OF THE INVENTION

The invention relates to a cleaning article comprising one or more lines of frangibility wherein the lines of frangibility form at least two pads and wherein the at least two pads are delineated.

BACKGROUND OF THE INVENTION

Blocks of melamine-based foam have been recognized as having useful cleaning properties when wetted with water and rubbed against certain surfaces to be cleaned. Commercially marketed blocks of melamine-based foam may be configured to employ lines of frangibility such that a user of the melamine foam block can break the block into two or more melamine foam pads for immediate and/or later use.

Unfortunately, commercially marketed blocks of melamine-based foam with lines of frangibility suffer from at least one drawback. Although present on the foam, the lines of frangibility are not readily apparent to consumers due to the continuous color of the melamine-based foam. Consumers therefore often tear the foam in areas other than along the lines of frangibility.

Commercially marketed blocks of melamine-based foam also suffer in that the lines of frangibility do not allow the consumer to easily form foam pads with different sizes. Consumers who need to use only a small portion of the foam block are forced to either store a partially dirty foam block until a second use, or throw away the block thereby wasting the unused sections. In addition, consumers desire different size pads that conform to the size of the space that needs to be cleaned since they have a difficult time cleaning small areas with a large block of melamine-based foam.

Accordingly, there is a need for a cleaning article in the form of a melamine-based foam block with lines of frangibility that form different foam pads that are clearly delineated. In addition, there is a need for melamine-based foam with lines of frangibility that form different foam pads with different sizes.

SUMMARY OF THE INVENTION

A melamine-based foam block that has delineated pads provides a user of the block with the convenience of knowing where the individual pads are located when the lines of frangibility are not readily apparent. In addition, the pads may have differing shapes and sizes from one another so that consumers may select the pad that is best suited for a particular cleaning job. Various features and advantages of the invention will be set forth in part in the following description.

The present invention provides a cleaning article comprising a melamine-based foam block for use in cleaning a surface through wiping or scrubbing, either in a dry state, in the presence of water, or in the presence of other cleaning agents.

The invention herein relates to a cleaning article comprising a melamine-based foam block having one or more lines of frangibility, wherein the lines of frangibility form at least two pads and wherein the at least two pads are delineated. In one embodiment, the least two pads are delineated by ink lines, and the ink lines typically border at least a section of the perimeter of the at least two pads. The ink lines maybe broken or solid lines. In another aspect, the at least two pads are delineated by raised bumps, grooves, colors, or combinations thereof.

In one embodiment, the cleaning article comprises a compressed melamine-based foam block having one or more lines of frangibility wherein the lines of frangibility form at least two pads, and wherein the at least two pads have different sizes, and the at least two pads are each delineated. In another aspect, the block comprises at least three pads having at least two, in another embodiment at least three, different sizes. In one embodiment, the at least two pads are delineated by different patterns. In another embodiment, the different size pads are delineated by different colors.

In still another aspect, the different size pads are delineated by different symbols, or by markings, associating the pads with size. In yet another aspect, the at least three pads are delineated by ink lines, typically bordering at least a section of the perimeter of the at least three pads.

As discussed more fully herein, the lines of frangibility comprise a plurality of indentations or openings in the foam block. In one embodiment, the foam block has a thickness and the openings penetrate the entire thickness of the block.

BRIEF DESCRIPTION OF THE DRAWINGS

The detailed description of the drawings particularly refers to the accompanying figures in which.

DETAILED DESCRIPTION OF THE INVENTION

Figure 1:
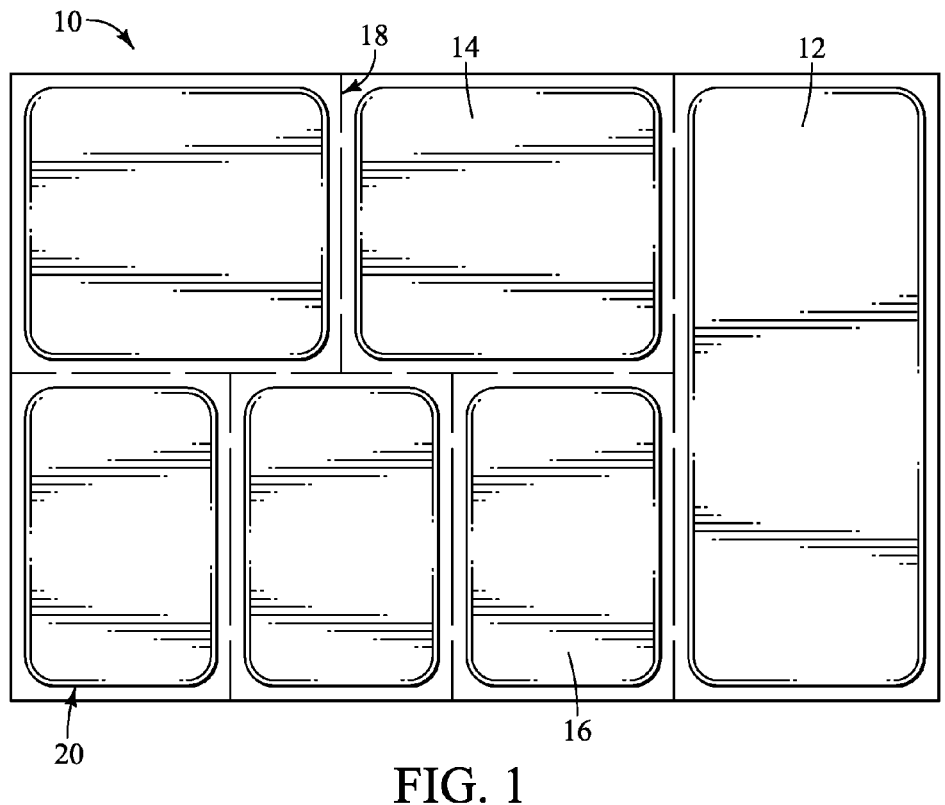
FIG. 1 is a top view of a cleaning article comprising pads delineated by lines.

Within the context of this specification, each term or phrase below includes the following meaning or meanings:

"Attach" and its derivatives refer to the joining, adhering, connecting, bonding, sewing together, or the like, of two elements. Two elements will be considered to be attached together when they are integral with one another or attached directly to one another or indirectly to one another, such as when each is directly attached to intermediate elements. "Attach" and its derivatives include permanent, releasable, or refastenable attachment. In addition, the attachment can be completed either during the manufacturing process or by the end user.

"Delineate" refers to markings that may be made by any means such as lines, bumps, grooves, colors, patterns, symbols, and size indicators.

"Disposable" refers to articles that are designed to be discarded after a limited use rather than being laundered or otherwise restored for reuse.

The terms "disposed on," "disposed along," "disposed with," or "disposed toward" and variations thereof are intended to mean that one element can be integral with another element, or that one element can be a separate structure bonded to or placed with or placed near another element.

Principles for manufacturing compressed melamine-based foam are well known. Melamine-based foams are currently manufactured by BASF (Ludwigshafen, Germany) under the BASOTECT® brand name. For example, BASOTECT® 2011, with a density of about 0.01 g/cm3, may be used. Blocks of melamine-based foam for cleaning are marketed by Procter & Gamble (Cincinnati, Ohio) under the MR. CLEAN® brand name, and under the CLEENPRO™ name by LEC, Inc. of Tokyo, Japan. Melamine-based foam is also marketed for acoustic and thermal insulation by many companies such as American Micro Industries (Chambersburg, Pa.).

Principles for production of melamine-based foam are also disclosed by H. Mahnke et al. in EP-B 071 671, published Dec. 17, 1979. According to EP-B 017 671, they are produced by foaming an aqueous solution or dispersion of a melamine-formaldehyde condensation product which comprises an emulsifier (e.g., metal alkyl sulfonates and metal alkylaryl sulfonates such as sodium dodecylbenzene sulfonate), an acidic curing agent, and a blowing agent, such as a C5-C7 hydrocarbon, and curing the melamine-formaldehyde condensate at an elevated temperature. The foams are reported to have the following range of properties:

a density according to DIN 53 420 between 4 and 80 grams per liter (g/l), corresponding to a range of 0.004 g/cc to 0.08 g/cc (though for purposes of the present invention the density can also range from about 0.006 g/cc to about 0.1 g/cc, or other useful ranges);

a thermal conductivity according to DIN 52 612 smaller than 0.06 W/m ° K;

a compression hardness according to DIN 53 577 under 60% penetration, divided by the density, yielding a quotient less than 0.3 (N/cm2)/(g/l), and preferably less than 0.2 (N/cm2)/(g/l), whereby after measurement of compression hardness the thickness of the foam recovers to at least 70% and preferably at least 90% of its original thickness;

an elasticity modulus according to DIN 53 423, divided by the density of the foam, under 0.25 (N/mm2)/(g/l) and preferably under 0.15 (N/mm2)/(g/l);

a bending path at rupture according to DIN 53 423 greater than 6 mm and preferably greater than 12 mm; and a tensile strength according to DIN 53 571 of at least 0.07 N/mm2 or preferably at least 0.1 N/mm2.

The foam may be molded or shaped into three-dimensional shapes for aesthetic or functional purposes. For example, melamine-based foam may be thermally molded according to the process disclosed in U.S. Pat. No. 6,608,118, "Melamine Molded Foam, Process for Producing the Same, and Wiper," issued Aug. 19, 2003 to Y. Kosaka et al., herein incorporated by reference, which discloses molding the foam at 210 to 350 C (or, more particularly, from 230° C. to 280° C. or from 240° C. to 270° C.) for 3 minutes or longer to cause plastic deformation under load, wherein the foam is compressed to a thickness of about 1/1.2 to about 1/12 the original thickness, or from about 1/1.5 to about 1/7 of the original thickness. The compressed molded melamine foams can be joined to a urethane sponge layer to form a wipe, according to Kosaka et al.

As described by Kosaka et al., the melamine-based foam can be produced by blending major starting materials of melamine and formaldehyde, or a precursor thereof, with a blowing agent, a catalyst and an emulsifier, injecting the resultant mixture into a mold, and applying or generating heat (e.g., by irradiation or electromagnetic energy) to cause foaming and curing. The molar ratio of melamine to formaldehyde (i.e., melamine:formaldehyde) for producing the precursor is said to be 1:1.5 to 1:4, or more particularly 1:2 to 1:3.5. The number average molecular weight of the precursor can be from about 200 to about 1,000, or from about 200 to about 400. Formalin, an aqueous solution of formaldehyde, can be used as a formaldehyde source.

As monomers for producing the precursor, according to Kosaka et al., the following monomers may be used in an amount of 50 parts by weight (hereinafter abbreviated as "parts") or less, particularly 20 parts by weight or less, per 100 parts by weight of the sum of melamine and formaldehyde. Melamine is also known by the chemical name 2,4,6-triamino-1,3,5-triazine. As other monomers corresponding to melamine, there may be used C1-5 alkyl-substituted melamines such as methylolmelamine, methylmethylolmelamine and methylbutylolmelamine, urea, urethane, carbonic acid amides, dicyandiamide, guanidine, sulfurylamides, sulfonic acid amides, aliphatic amines, phenols and the derivatives thereof. As aldehydes, there may be used acetaldehyde, trimethylol acetaldehyde, acrolein, benzaldehyde, furfurol, glyoxal, phthalaldehyde, terephthalaldehyde, and the like.

As the blowing agent, there may be used pentane, trichlorofluoromethane, trichlorotrifluoroethane, etc. As the catalyst, by way of example, formic acid may be used and, as the emulsifier, anionic surfactants such as sodium sulfonate may be used.

The amount of the electromagnetic energy to be irradiated for accelerating the curing reaction of the reaction mixtures can be adjusted to be from about 500 to about 1,000 kW, or from about 600 to 800 kW, in electric power consumption based on 1 kg of an aqueous formaldehyde solution charged in the mold. If the electric power applied is insufficient, there may be insufficient foaming, leading to production of a cured product with a high density. On the other hand, in case when the electric power consumption is excessive, the pressure upon foaming becomes high, leading to significant exhaust flows from the mold and even the possibility of explosion.

Other useful methods for producing melamine-based foam are disclosed in U.S. Pat. No. 5,413,853, "Melamine Resin Foam," issued May 9, 1995 to Y. Imashiro et al., herein incorporated by reference. According to Imashiro et al., a melamine resin foam can be obtained by coating a hydrophobic component on a known melamine-formaldehyde resin foam body obtained by foaming a resin composition composed mainly of a melamine-formaldehyde condensate and a blowing agent. The components used in the present melamine resin foam can therefore be the same as those conventionally used in production of melamine-formaldehyde resins or their foams, except for the hydrophobic component.

As an example, Imashiro et al. disclose a melamine-formaldehyde condensate obtained by mixing melamine, formalin and paraformaldehyde and reacting them in the presence of an alkali catalyst with heating. The mixing ratio of melamine and formaldehyde can be, for example, 1:3 in terms of molar ratio.

The melamine-formaldehyde condensate can have a viscosity of about 1,000-100,000 cP, more specifically 5,000-15,000 cP and can have a pH of 8-9.

As the blowing agent, a straight-chain alkyl hydrocarbon such as pentane or hexane is disclosed.

In order to obtain a homogeneous foam, the resin composition composed mainly of a melamine-formaldehyde condensate and a blowing agent may contain an emulsifier. Such an emulsifier includes, for example, metal alkylsulfonates and metal alkylarylsulfonates.

The resin composition may further contain a curing agent in order to cure the foamed resin composition. Such a curing agent includes, for example, acidic curing agents such as formic acid, hydrochloric acid, sulfuric acid and oxalic acid.

The foam disclosed by Imashiro et al. can be obtained by adding as necessary an emulsifier, a curing agent and further a filler, etc. to the resin composition composed mainly of a melamine-formaldehyde condensate and a blowing agent, heat-treating the resulting mixture at a temperature equal to or higher than the boiling point of the blowing agent to give rise to foaming, and curing the resulting foam.

In another embodiment, the foam material may comprise a melamine-based foam having an isocyanate component (isocyanate-based polymers are generally understood to include polyurethanes, polyureas, polyisocyanurates and mixtures thereof). Such foams can be made according to U.S. Pat. No. 5,436,278, "Melamine Resin Foam, Process for Production Thereof and Melamine/Formaldehyde Condensate," issued Jul. 25, 1995 to Imashiro et al., herein incorporated by reference, which discloses a process for producing a melamine resin foam comprising a melamine/formaldehyde condensate, a blowing agent and an isocyanate. One embodiment includes the production of a melamine resin foam obtained by reacting melamine and formaldehyde in the presence of a silane coupling agent. The isocyanate used in U.S. Pat. No. 5,436,278 can be exemplified by CR 200 (a trademark of polymeric-4,4'-diphenylmethanediisocyanate, produced by Mitsui Toatsu Chemicals, Inc.) and Sumidur E211, E212 and L (trademarks of MDI type prepolymers, produced by Sumitomo Bayer Urethane Co., Ltd). One example therein comprises 100 parts by weight of melamine/formaldehyde condensate (76% concentration), 6.3 parts sodium dodecylbenzenesulfonate (30% concentration), 7.6 parts pentane, 9.5 parts ammonium chloride, 2.7 parts formic acid, and 7.6 parts CR 200. A mixture of these components is placed in a mold and foamed at 100° C., yielding a material with a density of 26.8 kg/m3 (0.0268 g/cm3), a compression stress of 0.23 kgf/cm2, and a compression strain of 2.7%. In general, the melamine-based foams of U.S. Pat. No. 5,436,278 typically have a density of 25-100 kg/m3, a compression strain by JIS K 7220 of 2.7%-4.2% (this is said to be improved by about 40%-130% over the 1.9% value of conventional fragile melamine foams), and a thermal conductivity measured between 10° C. to 55° C. of 0.005 kcal/m-h-° C. or less (this is far smaller than 0.01 kcal/m-h-° C. which is said to be the value of conventional fragile foam). Other foams comprising melamine and isocyanates are disclosed in WO 99/23160, "Composition and Method for Insulating Foam," published May 14, 1999 by Sufi, the U.S. equivalent (application U.S. Pat. No. 9,823,864) is herein incorporated by reference.

Any of the preceding versions of melamine-based foam shaped into the form of a block may be modified to comprise one or more lines of frangibility so that the foam block may be broken into two or more pads for immediate or later use. The lines of frangibility may be introduced to the melamine-based foam block in a variety of ways. For example, a line of pins having a certain diameter, and spaced equidistantly apart from one another, may be pressed through some or all of the thickness of a melamine foam. Lines of frangibility may comprise other modifications to the foam block, so long as the line of frangibility is, in effect, a line of weakness along which a user of the block may readily separate the melamine block into pads of melamine foam.

Reference will now be made in detail to embodiments of the invention, one or more examples of which are illustrated in the drawings. Each example is provided by way of explanation of the invention, and is not meant as a limitation of the invention. For example, features illustrated or described as part of one embodiment can be used with another embodiment to yield still a third embodiment. It is intended that the present invention include these and other modifications and variations.

The present invention provides for a cleaning article in the form of a melamine-based foam block comprising lines of frangibility that separate the foam block into individual foam pads, the pads of which may be of varying sizes. Further, these foam blocks are each delineated so that consumers are able to see the individual pads and are able to determine where the foam block should be broken along the lines of frangibility to obtain the desired foam pad. The melamine-based foam pads are then used in cleaning a surface through wiping or scrubbing, either in a dry state, in the presence of water, or in the presence of other cleaning agents or other compounds.

The present invention provides for a cleaning product which may be a cleaning article as shown in FIG. 1. The cleaning article includes a melamine-based foam block 10 that generally has an open celled structure which when moved over a surface is capable of effectively cleaning dirt and other unwanted elements from the surface.

FIG. 1 depicts the melamine-based foam block 10 as possessing a generally rectangular shape. In this representative embodiment of the invention, the block 10 has a length of about 20.5 centimeters, a width of about 13 centimeters, and a thickness (not shown) of about 1.8 cm. A melamine-based foam block of the present invention may possess a variety of shapes, including, for example, a generally square shape or a generally oval shape. Also, some or all of the perimeter of the block may be shaped to facilitate gripping by the human hand (e.g., by having an undulating perimeter that allows a user to place one or more of his or her fingers into depressions or grooves at the perimeter).

In one embodiment, the block can be broken into individual melamine-based pads having the same size. In another embodiment, at least two of the melamine-based pads have different sizes; in another embodiment at least three of the pads have three different sizes. In this representative embodiment, the pad 12 has a length of about 6 centimeters and a width of about 13 centimeters, the pad 14 has a length of about 7 centimeters and a width of about 6.5 centimeters, and the pad 16 has a length of about 4.5 centimeters and a width of about 6.5 centimeters.

The thickness of the layers depicted in the exemplary embodiment of FIG. 1 can vary. The cleaning article may be configured such that the melamine-based foam comprising the block is a relatively thin layer. In one embodiment, the foam is from about 2 millimeters to about 8 millimeters in thickness. In one embodiment the foam may have a uniform thickness. In another embodiment, the foam may have a varying thickness, for instance being 1 millimeter thick at certain portions, and being 10 millimeters thick at other portions. Additionally, the present invention includes exemplary embodiments where the foam is less than 60 millimeters in thickness; in another embodiment less than 15 millimeters in thickness; in another embodiment less than 10 millimeters in thickness; and in another embodiment less than 5 millimeters in thickness.

In FIG. 1, the foam block 10 includes lines of frangibility 18. In one embodiment, the lines of frangibility comprise circular holes. The circular holes may have a diameter of about 0.5 mm or greater; of about 1 mm or greater; of about 2 mm or greater; or of about 3 mm or greater. If the openings are of other shapes (e.g., square, triangular, etc.), then the cross-sectional area of such openings may be selected to correspond to the cross-sectional areas associated with the circular openings recited in the preceding sentence.

As noted above, individual openings need not penetrate through the entire thickness of the block. Also, rather than individual openings, the foam can be modified to have indentations in the surface of the block, thereby creating lines of frangibility along which a user may separate the block into pieces.

The lines of frangibility 18 separate the melamine based foam block 10 into individual melamine-based pads. The melamine-based pads are delineated to indicate to consumers the presence of different pads. In FIG. 1, the melamine-based pads are delineated by ink lines 20. The ink lines 20 may be broken lines or solid lines. In one embodiment, the ink lines border at least a section of the perimeter of at least one, in another embodiment each one, of the melamine-based pads.

In one embodiment, the ink lines are water insoluble ink for use on melamine-based foam that contacts water for cleaning. The ink lines can be applied to the melamine-based foam by any conventional methods known in the art. In one embodiment, the ink lines are applied to the melamine-based foam by ink jet printing.

The melamine-based foam pads can also be delineated by grooves in the melamine-based foam. In another embodiment, the melamine-based pads are delineated by raised bumps on the foam. In both embodiments, the grooves and the raised bumps border at least a portion of the perimeter of at least one of the melamine-based foam pads.

Figure 2:
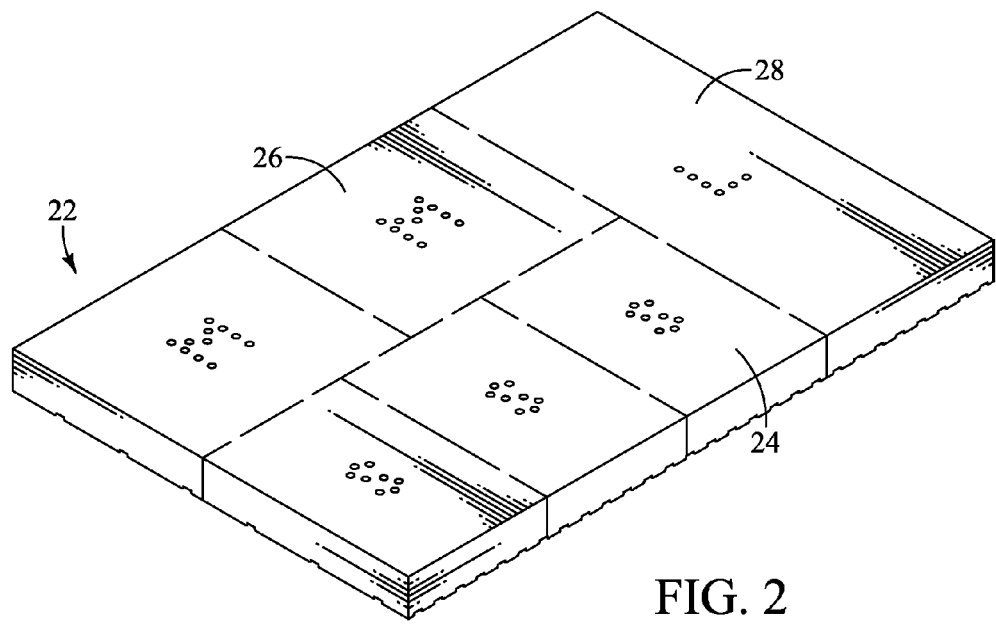
FIG. 2 is a top perspective of a cleaning article comprising pads delineated by size markings.

In FIG. 2, the melamine-based foam block 22 has pads that are delineated by markings associating the pads with size. In the embodiment, the smallest pads 24 are delineated by the size marking "S" for small, the intermediate pads 26 are delineated by the size marking "M" for medium, and the largest pad 28 is delineated by the size marking "L" for large.

Figure 3:
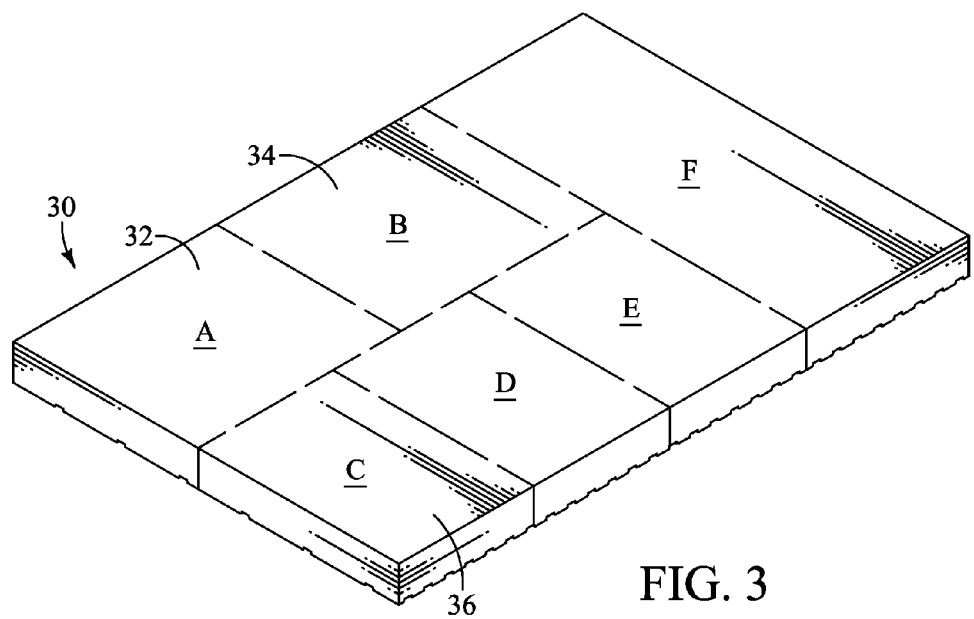
FIG. 3 is a top perspective of a cleaning article comprising pads delineated by color.

In another embodiment, the melamine-based pads are delineated by color. In one embodiment, at least one of the melamine-based pads is delineated by a color different than any other melamine-based pad attached to the same block; in another embodiment, at least two of the pads are delineated by a color different than another melamine-based pad. In FIG. 3, the melamine-based foam block 30 has at least three different colors: A, B, and C. In one embodiment, color A on the first pad 32 designates red, color B on the second pad 34 designates blue, and color C on the third pad 36 designates green. The colors provided can be any color so long as they differ from the color on at least one other adjacent pad.

Figure 4:
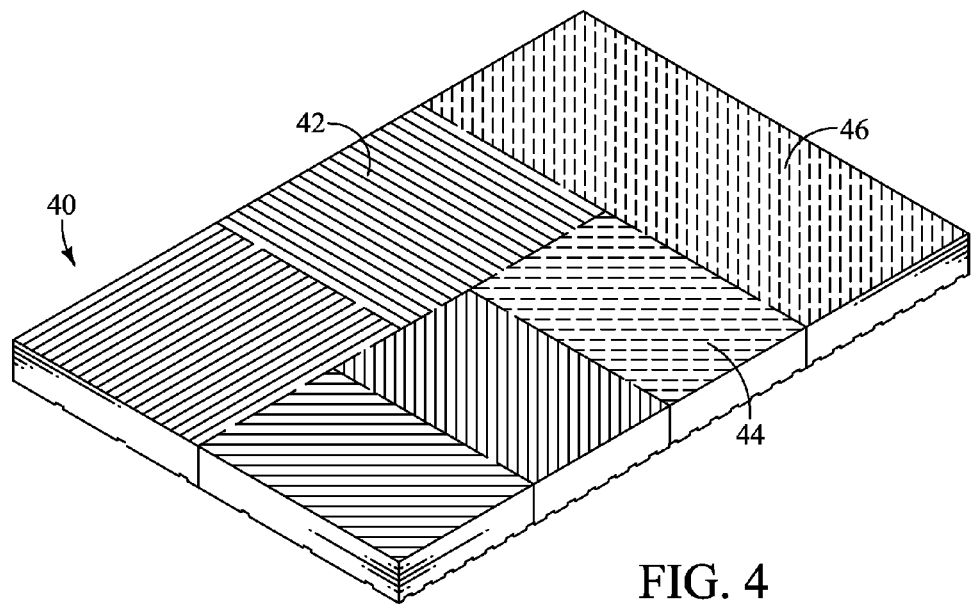
FIG. 4 is a top perspective of a cleaning article comprising pads delineated by patterns.

In FIG. 4, the melamine-based foam block 40 has the individual foam pads delineated by patterns. In one embodiment, at least one of the melamine based foam pads is delineated by a pattern different than another melamine based pad, in another embodiment another adjacent pad. In another embodiment, at least two of the pads are delineated by a pattern different than another melamine based foam pad, in another embodiment another adjacent pad. In FIG. 4, the melamine based block 40 has at least three different patterns. In one embodiment, the first pad 42 has a first pattern, the second pad 44 has a second pattern, and the third pad 46 has a third pattern. Any pattern may be used so long as the pattern on at least one pad differs from the pattern on a second pad.

Figure 5:
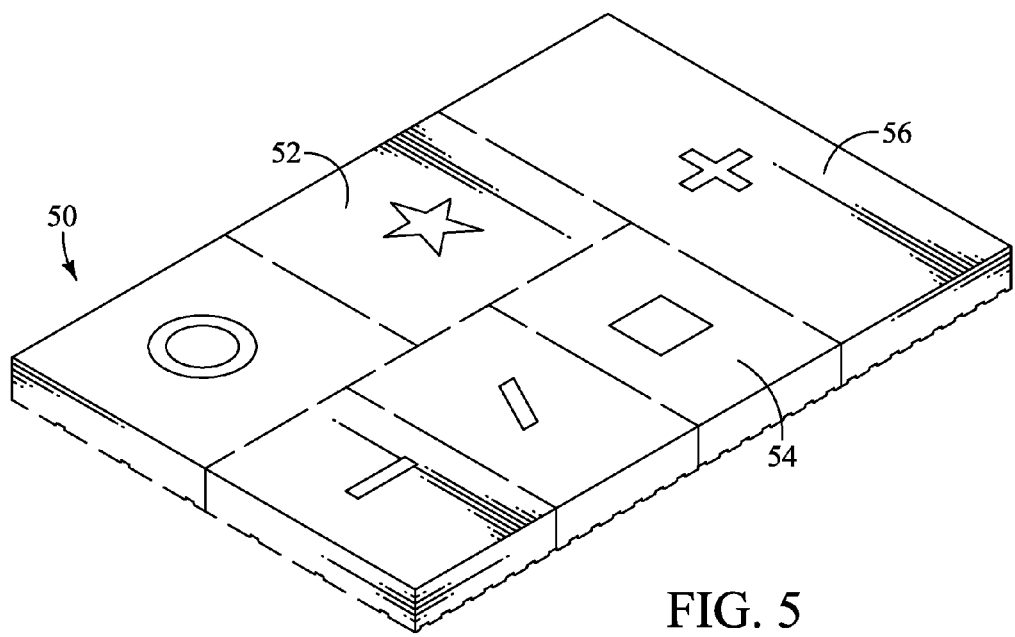
FIG. 5 is a top perspective view of a cleaning article comprising pads delineated by symbols.

The melamine-based foam pads can also be delineated by symbols other than size symbols. In one embodiment, at least one of the melamine-based pads is delineated by a symbol different than another melamine-based pad; in another embodiment, at least two of the pads are delineated by a symbol different than another melamine based pad, in one embodiment another adjacent pad. In FIG. 5, the melamine-based foam block 50 has at least three different symbols. In one embodiment, the first pad 52 has a star symbol, the second pad 54 has a rectangular symbol, and the third pad 56 has a plus symbol. Any symbol, such as hearts, stars, dashes, slashes, circles, and rectangles, may be used so long as the symbol on one pad differs from the symbol on at least one other pad.

In another embodiment, the melamine-based foam pads are delineated by messages, statements, or symbols. Such messages, statements, or symbols may be fashioned to help facilitate or establish an association in the mind of a user of the foam between a cleaning article and one or more mental states. The messages, statements, or symbols may include various alphanumeric strings, including, for example: clean, fresh, mountain, country, zest, sea, sky, health, hygiene, water, waterfall, moisture, moisturize, scent, convenient, single, child, environment, disposable, derivatives or combinations thereof, or other such words or states. In one embodiment, the messages, statements, or symbols associate a cleaning article of the present invention and less waste, increased efficiency, increased effectiveness, or some combination thereof. In another embodiment, the messages, statements, or symbols associate a cleaning article of the present invention and disposability. In another embodiment, the messages, statements, or symbols associate a cleaning article of the present invention and a registered or common-law trademark of the seller, manufacturer, and/or distributor of the appliance. For example, a statement could be disposed in or on a container containing a cleaning composite of the present invention that associates the cleaning article with the logo or brand name of MR. CLEAN®, PLEDGE®, MR. PROPER®, FLASH®, P&G®, AJAX®, FABULOSO®, CIF®, CLOROX®, PINE-SOL®, LYSOL®, SCRUBBING BUBBLES®, FANTASTIC®, 409®, TILEX®, SCRUBBY®, COMET®, SWIFFER™, VIVA®, KLEENEX®, SCOTT®, FEBREEZE®, and combinations thereof. The symbol could associate a cleaning composite of the present invention with other cleaning formulations or cleaning substrates like those referenced in the preceding sentence. In another embodiment, the message, statements, or symbols associate a cleaning article of the present invention and the concept of a user being able to select a size for use by separating the cleaning composite into separate pads of melamine foam.

It should be noted that any method commonly known in the art of delineating the pads may be used (e.g., by printing, stamping, gluing, embossing; or the like) so long as the method does not interfere with the integrity of the melamine foam.

The melamine-based foam blocks may be packaged for consumers. In some embodiments of the present invention, a package will contain not only one or more melamine foam blocks of the present invention, but other products. In one embodiment, a melamine-based foam block of the present invention is sold, transferred, distributed, or marketed with a cleaning tool. It should be noted that such combinations may be marketed and packaged as described in the preceding paragraphs. It should also be noted that statements on packages, messages embodied in tangible media, and packages like those described in this paragraph may be associated with the brand name or logo of a private-label brand (meaning that a product or article of manufacture, like a cleaning composite of the present invention, is made by one company for sale under the logo or brand name of another company—often the logo or brand name of a retailer or distributor).

It should be understood that the present invention includes various modifications that can be made to the embodiments of the cleaning article as described herein as come within the scope of the appended claims and their equivalents.

In all embodiments of the invention, all percentages are by weight of the total composition, unless specifically stated otherwise. All ratios are weight ratios, unless specifically stated otherwise. All ranges are inclusive and combinable. The number of significant digits conveys neither a limitation on the indicated amounts nor on the accuracy of the measurements. All numerical amounts are understood to be modified by the word "about" unless otherwise specifically indicated. All such weights as they pertain to listed ingredients are based on the active level and do not include carriers or by-products that may be included in commercially available materials, unless otherwise specified.

It should be understood that every maximum numerical limitation given throughout this specification would include every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross referenced or related patent or application is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

What is claimed is:

1. A cleaning article comprising a compressed melamine based foam block having lines of frangibility, wherein the lines of frangibility form at least three pads, wherein the at least three pads have at least three mutually different sizes, and wherein the at least three pads are each delineated by respective size indicators disposed thereon, so that each indicator designates a particular size of said pad, said article comprising two lengthwise rows of pads, one lengthwise row comprising plural small sized pads and one lengthwise row comprising plural medium sized pads.

2. The cleaning article of claim 1, wherein the lines of frangibility comprise a plurality of openings in the foam block.

3. The cleaning article of claim 2, wherein the foam has a thickness and the openings penetrate the entire thickness of the foam block.

4. The cleaning article of claim 1 wherein the lines of frangibility comprise one or more indentations in said foam block.

5. The cleaning article of claim 1 having a small sized pad with the letter 'S' thereon, a medium sized pad with the letter 'M' thereon and a large sized pad with the letter 'L' thereon.

6. The cleaning article of claim 1 having a width and a length greater than said width and wherein a large sized pad subtends said entire width of said pad.

7. A rectangular cleaning article having a width and a length greater than said width, said article comprising: a compressed melamine based foam block having intersecting lines of frangibility, wherein the lines of frangibility form at least three cleaning pads, having at least three mutually different sizes, wherein a large sized pad subtends said entire width of said pad, and comprising two lengthwise rows of pads, one lengthwise row comprising plural small sized pads and one lengthwise row comprising plural medium sized pads.

8. A rectangular cleaning article according to claim 7 further comprising indicia on said each of pads.

* * * * *